United States Patent [19]
Houkes

[11] 3,912,971
[45] Oct. 14, 1975

[54] TELEVISION DISPLAY APPARATUS PROVIDED WITH A CIRCUIT ARRANGEMENT FOR GENERATING A SAWTOOTH DEFLECTION CURRENT

[75] Inventor: Henk Houkes, Nijmegen, Netherlands

[73] Assignee: U.S. Philips Corporation, New York, N.Y.

[22] Filed: Feb. 19, 1974

[21] Appl. No.: 443,863

[30] Foreign Application Priority Data

Mar. 8, 1973 Netherlands ...................... 7303252

[52] U.S. Cl. ................................ 315/408; 315/387
[51] Int. Cl.² ......................................... H01J 29/70
[58] Field of Search ........... 315/387, 399, 408, 409, 315/411

[56] References Cited

UNITED STATES PATENTS

| | | | |
|---|---|---|---|
| 3,401,306 | 9/1968 | Bolvin et al | 315/408 X |
| 3,441,791 | 4/1969 | Beck | 315/408 |
| 3,449,623 | 6/1969 | Dietz | 315/408 |
| 3,512,040 | 5/1970 | Lester | 315/408 X |

*Primary Examiner*—T. H. Tubbesing
*Attorney, Agent, or Firm*—Frank R. Trifari; Henry I. Steckler

[57] ABSTRACT

Television display apparatus including a circuit arranged for combined line deflection and supply voltage stabilisation, comprising a transformer. The transformation ratio can be freely chosen because the path between the deflection and stabilizing section is blocked in the retrace time.

8 Claims, 5 Drawing Figures

Figure 1:
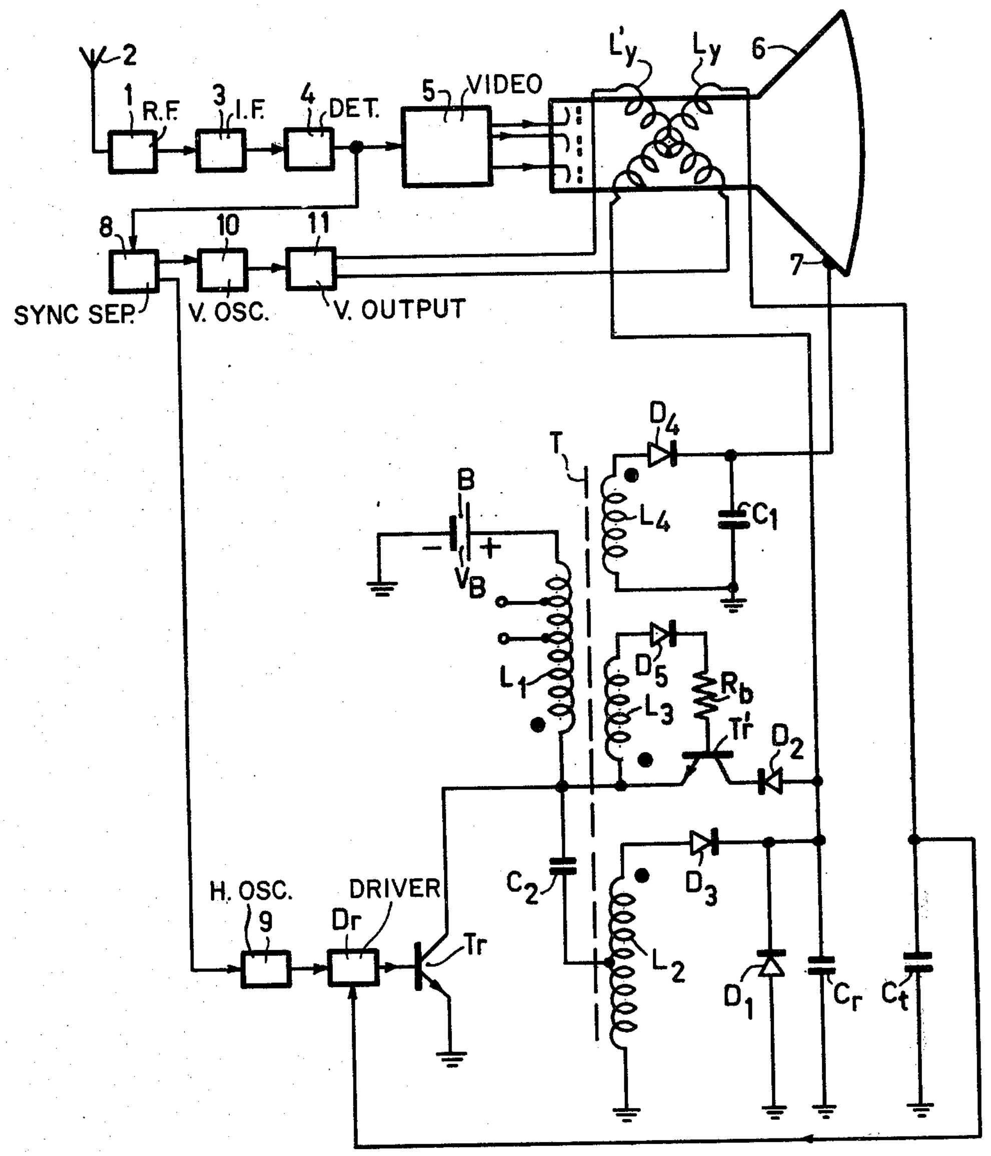

TELEVISION DISPLAY APPARATUS PROVIDED WITH A CIRCUIT ARRANGEMENT FOR GENERATING A SAWTOOTH DEFLECTION CURRENT

The invention relates to television display apparatus provided with a circuit arrangement for generating a sawtooth deflection current through a line deflection coil, said coil being a part of a network furthermore comprising at least a trace capacitor a retrace capacitor and a first diode through which the deflection current flows during part of the trace time while said current flows through a second diode and a controllable switch during the other part of the trace time, a primary winding of a transformer being incorporated between a direct voltage source and the switch and a secondary winding being connected through a third diode to the network.

Such a circuit arrangement is described in German patent application No. 2,130,902 and is the combination of a line deflection circuit and a switched supply voltage stabilisation circuit in which a single element, the above-mentioned switch, serves for fulfilling the two said functions.

In this German patent application no requirement has been imposed on the transformation ratio of the transformer, i.e., the ratio between the number of turns on the secondary winding and the number of turns on the primary winding. In practice, however, this ratio is determined in the first place by the ratio between the nominal value of the supply voltage supplied by the direct voltage source and the desired value of the trace voltage, i.e., the voltage to which the deflection coil is connected during the trace time. The value of the trace voltage is in turn determined by the desired intensity of the deflection current and consequently by the value of the impedance of the deflection coil. In the second place the said transformation ratio also depends on the ratio between the conduction period of the switch and the line period, which ratio itself is a function of the maximum fluctuation to be expected of the supply voltage generally derived from the electrical mains. It has been found in the known circuit arrangement that not every transformation ratio is possible because a distortion of the deflection current under given circumstances may occur. An object of the invention is to improve the said circuit arrangement in this respect and to this end the circuit arrangement according to the invention is characterized in that it includes switching means for blocking any current in the second diode in the retrace time.

As a result of the step according to the invention any arbitrary transformation ratio may be chosen as desired so that a greater degree of freedom is achieved in the design of the circuit arrangement.

The invention will be described in greater detail by way of example with reference to the Figures shown in the drawing.

Figures 2, 3:
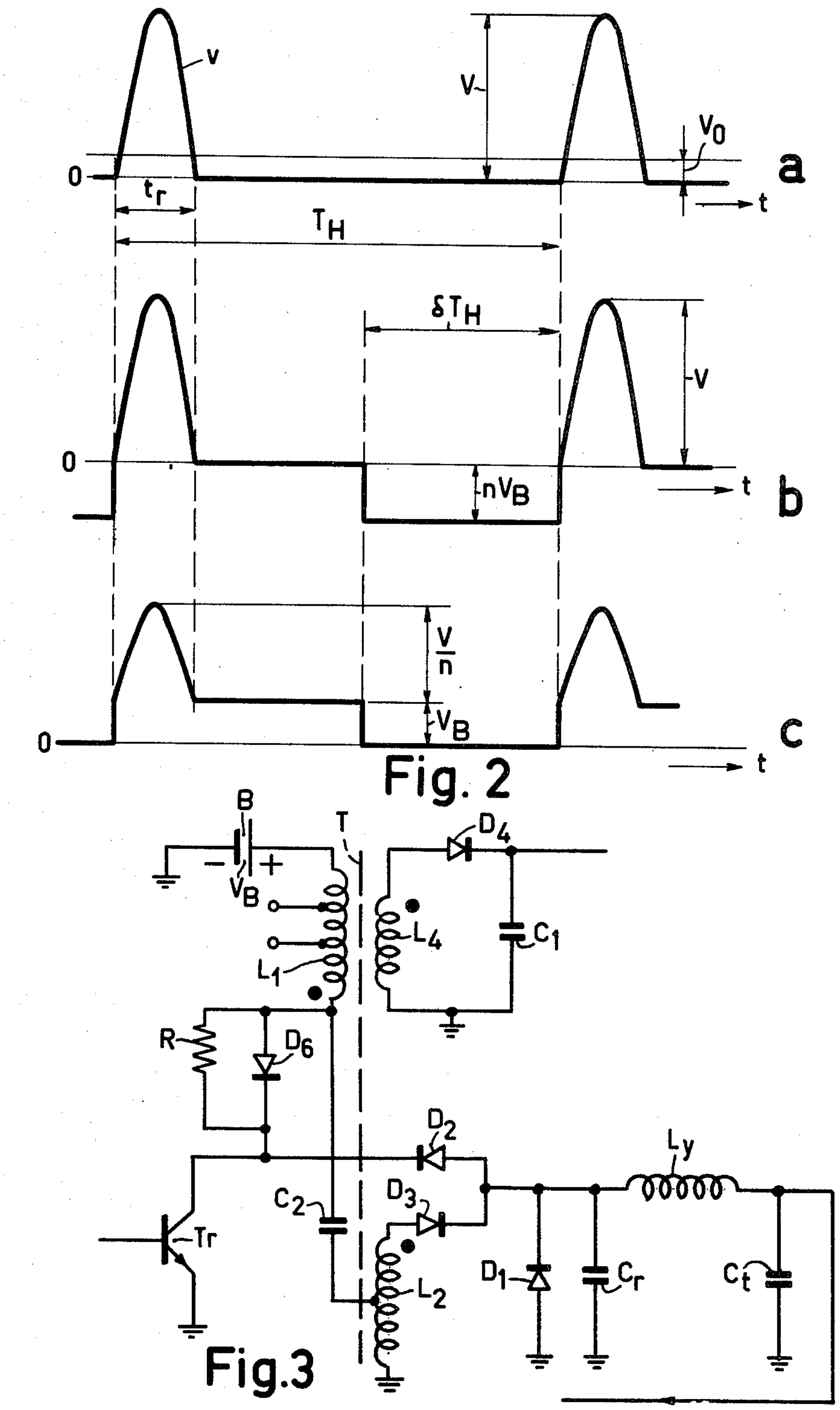
Figure 4:
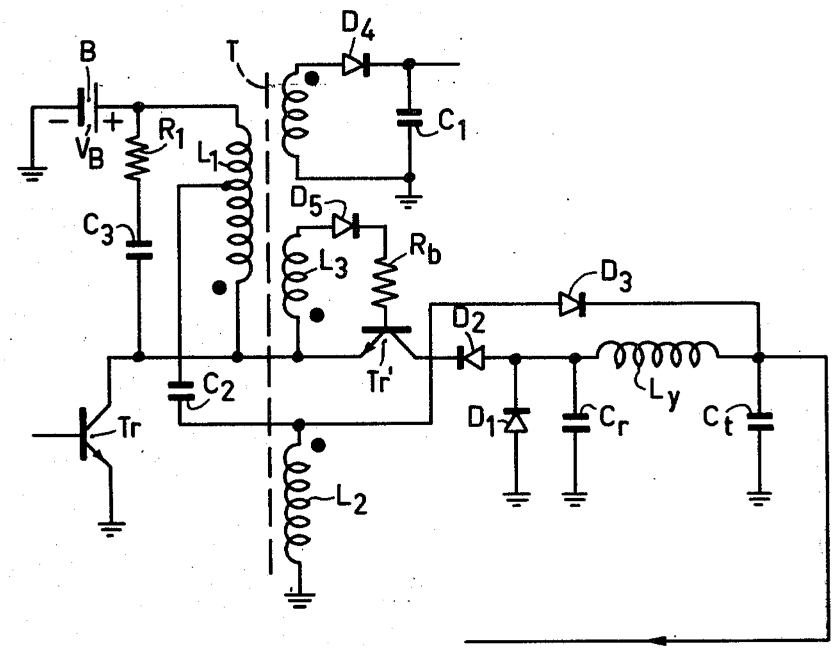
Figure 5:
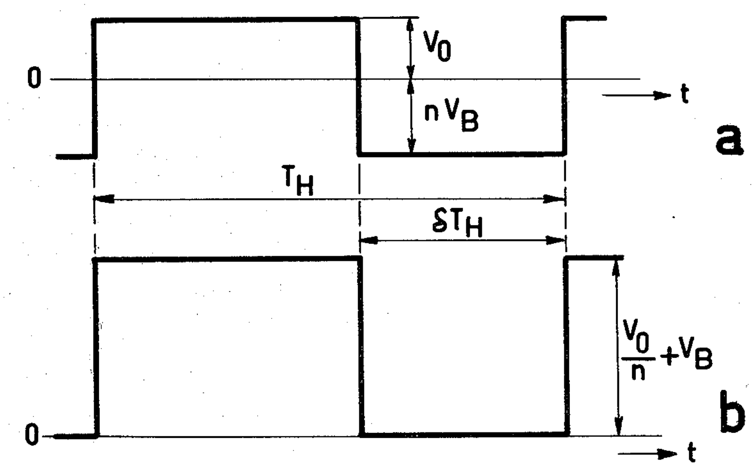

FIG. 1 shows a first embodiment of television display apparatus according to the invention, FIG. 2 shows some waveforms to explain the operation of the embodiment of FIG. 1, FIGS. 3 and 4 show different embodiments of circuit arrangements in television display apparatus according to the invention and FIG. 5 shows some waveforms to explain the operation of the embodiment of FIG. 4.

The television display apparatus of FIG. 1 has a high frequency tuner 1 for connection to an aerial 2, an intermediate frequency amplifier 3, a detector 4 and a video amplifier with a colour decoder 5 applying the colour signals to a colour television display tube 6. This tube has an acceleration anode 7 and is provided with a coil $L_Y$ for the horizontal (line frequency) deflection and a coil $L'_Y$ for the vertical (field frequency) deflection.

Line synchronizing pulses which are applied to a line oscillator 9 are separated from the output signal of detector 4 by means of synchronizing separator 8, as well as field synchronizing pulses which are applied to a field oscillator 10. Oscillator 10 controls a field output stage 11 which supplies the deflection current for coil $L'_Y$. Line oscillator 9 controls a driver stage $D_r$ which supplies switching pulses for a controlled switch, for example, a switching transistor $T_r$ of a line deflection output circuit to be described hereinafter.

A trace capacitor $C_t$ is arranged in series with line deflection coil $L_Y$ and a diode $D_1$ with the given conductivity direction and a retrace capacitor $C_r$ are arranged in parallel with the series arrangement thus formed. Capacitor $C_r$ may alternatively be connected in parallel across coil $L_Y$. The said four elements only show the principle circuit diagram with the main components of the deflection section. This section may be provided, for example, in known manner with one or more transformers for mutual coupling of the elements, with devices for centering and linearity correction and the like.

A secondary winding $L_2$ of a transformer T is arranged in series with a diode $D_3$ whose cathode is connected to the junction of elements $D_1$, $C_r$ and $L_Y$ and to the anode of a diode $D_2$. The cathode of diode $D_2$ is connected to the collector of a transistor Tr' of the npn type whose emitter is connected to one end of a primary winding $L_1$ of transformer T and to the collector of a transistor Tr of the npn type. The positive terminal of a direct voltage source B is connected to the other end of winding $L_1$ and the negative terminal is connected to the emitter of transistor Tr. This negative terminal is also connected to the free ends of elements $L_2$, $D_1$, $C_r$ and $C_t$ and may be connected to ground of the circuit arrangement.

One end of a further secondary winding $L_3$ of transformer T is directly connected to the emitter of transistor Tr' and the other end thereof is connected through a resistor $R_b$ to its base. Other secondary windings are wound on the core of transformer T across which there are voltages serving as supply voltages for other parts of the television display apparatus. One of these windings, winding $L_4$, is shown in FIG. 1 and generates the EHT for the acceleration anode 7 of tube 6 with the aid of an EHT rectifier $D_4$ across a smoothing capacitance $C_1$. The winding sense of the windings of transformer T shown is denoted by polarity dots in the Figure.

During a first part of the line trace time diode $D_1$ conducts. The voltage across capacitor $C_t$ is applied to deflection coil $L_y$ through which a sawtooth deflection current flows. At a given instant transistor Tr becomes conducting. When approximately in the middle of the trace time the deflection current reverses its direction, diode $D_1$ is blocked and both transistor Tr' and diode $D_2$ become conducting so that the deflection current then flows through transistor Tr while diode $D_3$ is blocked. At the end of the trace time transistor Tr is cut off. An oscillation, the flyback pulse, is produced across capacitor $C_r$ while the energy stored in winding $L_1$ and derived from source B produces a current through diode $D_3$. When the voltage across capacitor $C_r$ has become zero, diode $D_1$ becomes conducting: this is the beginning of a new trace time. Diode $D_3$ remains conducting until transistor Tr is rendered conducting while the energy in winding $L_2$ is transferred to winding $L_1$. Stabilisation is provided for example by the voltage across capacitor $C_t$ being fed back to driver circuit Dr in which a comparison stage and a modulator ensure that the conductivity time of transistor Tr is varied in such a manner that the said voltage and consequently the amplitude of the deflection current remain constant.

In FIG. 2*a* the voltage $v$ across capacitor $C_r$, and in FIG. 2*b* the voltage at the junction of winding $L_2$ and diode $D_3$ and in FIG. 2*c* the voltage at the collector of transistor Tr is plotted as a function of time. The symbol $T_H$ indicates the line period, while $t_r$ denotes the retrace time and $\delta T_H$ denotes the part of period $T_H$ when transistor Tr conducts. During the time when diode $D_3$ conducts the voltage in FIG. 2*b* is equal to that of FIG. 2*a*, i.e., the flyback pulse with amplitude V during the time $t_r$ and zero in the part of the trace time when transistor Tr does not conduct. At the instant when transistor Tr is rendered conducting its collector voltage becomes substantially zero. The voltage $V_B$ from source B is then present across winding $L_1$. If the transformation ratio of windings $L_1$ and $L_2$, i.e., the ratio between the number of turns on winding $L_1$ and those on winding $L_2$ is equal to $1:n$, the voltage of FIG. 2*b* is equal to $-nV_B$ during the time interval $\delta T_H$. The collector voltage of transistor Tr is equal to the voltage in FIG. 2*a* during the time interval $t_r$ divided by the ratio $n$ and supplemented by voltage $V_B$. It has been assumed in the foregoing that transistor Tr' conducts during the time interval $\delta T_H$ which will be described hereinafter.

When $V_o$ is the direct voltage across capacitor $C_t$ if this capacitor has a sufficiently high capacitance, or when it is the direct voltage component of the voltage across this capacitor if it has a comparatively low capacitance in view of the so-called S-correction, $V_o$ is equal to the mean value of the voltage $v$. In fact, no direct voltage component can be present across coil Ly. There applies that $$V_o = \frac{1}{T_H} \int_o^{t_r} vdt \qquad (1)$$

The means value of the voltage across winding $L_2$ is also zero so that there applies that $$\int_o^{t_r} vdt - nV_B.\ \ \delta T_H = O \qquad (2)$$

In formula (2) the integral according to (1) can be filled in so that $$V_o T_H = nV_B \cdot \delta\ T_H, \text{ that is, } V_o = n\ \delta \cdot V_B. \qquad (3)$$

A voltage which is equal in shape to that in FIG. 2*b* is present across winding $L_3$, but it has a polarity between the base and the emitter of transistor Tr' which is reversed relative thereto. During the time interval $\delta T_H$ the voltage at the base of transistor Tr' is positive relative to the voltage at the emitter and during the time interval $t_r$ the base voltage is negative relative to the emitter voltage. Consequently transistor Tr' does not conduct during the time interval $t_r$. The diode $D_5$ incorporated between the base and the emitter ensures that the base emitter voltage cannot become more negative than is admitted. This diode may alternatively be arranged in series with the resistor $R_b$ as is the case in FIG. 1. During the first part of the trace time in FIG. 2*b* the transistor Tr' does not conduct. It does conduct during the time interval $\delta T_H$ provided that the transformation ratio between windings $L_2$ and $L_3$ and resistor $R_b$ have suitable values.

The above-described operation of transistor Tr' is necessary for the following reason. During the retrace time its collector voltage is equal to $v$ while the emitter voltage is equal to $$\frac{V}{n} + V_B.$$

In the middle of time $t_r$ these voltages are equal to $V$ and to $$\frac{V}{n} + V_B.$$

Without special steps the transistor will conduct during the retrace time if $V$ is higher than or equal to $$\frac{V}{n} + V_B.$$

Dependent on the value of the flyback ratio $$z = \frac{t_r}{t_H},$$

$V$ and $V_o$ are proportional, i.e., $V = \alpha\ V_o$ in which the number $\delta \approx 10$ if $z = 1/6$. The above-mentioned condition then is:

$$\alpha V_o \geq \frac{\alpha V_o}{n} + V_B.$$

Filling this in in formula (3) results in:

$$\alpha n\ \delta \cdot V_B \geq \alpha\ \delta \cdot V_B + V_B \qquad (4)$$

that is $$n \geq 1 + \frac{1}{\alpha\delta}$$

As is known transistor Tr conducts at its earliest at the commencement and at its latest in the middle of the trace time, that is to say, the order of $\delta$ is one-half. The limit value according to condition (4) is then approximately equal to $n = 1 + 1/5 = 1.2$. The maximum value of $\delta$ is $1 - z$ (transistor Tr conducts at the beginning of the trace time) that is $\delta \approx 5/6$ so that the minimum limit value is approximately $$1 + \frac{1.2}{\alpha}.$$

Without the step according to the invention transistor Tr' would conduct during the retrace time if the ratio $n$ satisfies formula (4), that is to say, the path between the deflection and stabilizing section of the circuit arrangement would not be blocked. Since diode $D_3$ conducts during the same time, windings $L_1$ and $L_2$ would be short-circuited by transistor Tr' and diodes $D_2$ and $D_3$ so that the flyback pulse across capacitor $C_r$ would be cut off and the deflection current would be distorted.

A transformation ratio of more than 1 may be necessary if deflection coil $L_y$ has a comparatively high impedance. The current which is then required may only be supplied by a higher $V_o$ for a given $V_B$ which according to formula (3) is only possible by a higher $n$. It may alternatively occur that voltage $V_B$ is comparatively low which leads to the same step. It may be noted that the maximum collector voltage of transistor Tr is equal to $$\frac{V}{n} + V_B = \frac{\alpha V_o}{n} + V_B = (1 + \alpha\delta)\,V_B$$

after filling in formula (3) and is therefore independent of ratio $n$, while the maximum collector current, i.e., the sum of the deflection current and the current through winding $L_1$ at the end of the trace time can be made as low as possible by a suitable design of the circuit arrangement.

As is known a capacitor $C_2$ may be arranged between windings $L_1$ and $L_2$ which capacitor has for its object to prevent parasitic oscillations which may be caused by the leakage inductance existing between the said windings. In order that no line frequency voltage is present across capacitor $C_2$ it may be arranged between taps of windings $L_1$ and/or $L_2$ when ratio $n$ is not equal to 1. For $n > 1$ capacitor $C_2$ is arranged between the collector of transistor Tr and a tap on winding $L_2$ with which the transformation ratio between winding $L_1$ and the upper part of winding $L_2$ is equal to 1:1. Source $V_B$ may be connected to taps on winding $L_1$, for example, when using television display apparatus according to the invention in countries where different mains voltages are used.

In the embodiment of FIG. 3 in which for the sake of simplicity only the important elements are shown transistor Tr' is absent. If transformation ratio $n$ satisfies condition (4), diode $D_2$ is prevented from carrying a current during the retrace time by incorporating a diode $D_6$ in series with winding $L_1$. It is true that diode $D_2$ is almost brought to the conducting state so that the flyback pulse is also present at the collector of transistor Tr, but a current cannot flow through diode $D_2$. Diode $D_6$ is shunted by a resistor R which ensures that the parasitic capacitance relative to ground of the collector of transistor Tr and elements connected thereto is already discharged at the instant when transistor Tr is rendered conducting. This resistor may alternatively be arranged between the collector of transistor Tr and one of the terminals of source B, but the dissipation therein would be greater. The resistance of resistor R is high enough in order for the current flowing therethrough and through diode $D_2$ to be negligibly small. It will, however, be evident that the separating action of transistor Tr' in FIG. 1 is better. It will be noted that it is more advantageous to arrange diode $D_6$ between winding $L_1$ and transistor Tr than to arrange it between winding $L_1$ and source B. In the latter case there is no point on winding $L_1$ connected to point of fixed potential and capacitor $C_2$ cannot be provided.

It will be noted that the maximum collector voltage of transistor Tr is equal to voltage V if the ratio $n$ is larger than the above-mentioned limit value and is therefore directly proportional to ratio $n$. On the other hand the maximum collector current is inversely proportional to ratio $n$ when the current through winding $L_1$ is not taken into account so that the switching capacity of transistor Tr, i.e., the product of the collector peak voltage by the collector peak current, is independent of $n$. When ratio $n$ is lower than the limit value given by formula (4) the switching capacity is higher because the collector peak voltage of the transistor is higher than voltage V. Due to the step according to the invention the optimum switching capacity can thus be utilized.

FIG. 4 shows an embodiment of the circuit arrangement according to the invention in which the cathode of diode $D_3$ is not connected to capacitor $C_r$ but to capacitor $C_t$. Such a modification is also described in the said German patent application.

During the conductivity time of diode $D_3$, that is, during the retrace time and the first part of the trace time the voltage $V_o$ across capacitor $C_t$ is also across winding $L_2$: see FIG. 5*a* in which the capacitance of capacitor $C_t$ is assumed to be very large. Since the voltage across winding $L_1$ is equal to $(V_o/n)$, the collector voltage of transistor Tr is equal to $$\frac{V_o}{n} + V_B$$

(see FIG. 5*b*). During the conductivity interval $\delta T_H$ of transistor Tr the voltage $V_B$ is present across winding $L_1$ so that the voltage $-nV_B$ is present across winding $L_2$. In a manner corresponding to that in FIG. 1 we can write $V_o\,(1-\delta)T_H = nV_B \cdot \delta\, T_H$ which is:

$$V_o = \frac{n\,\delta}{1-\delta}\,V_B \qquad (3')$$

Without the step according to the invention diode $D_2$ would conduct during the retrace time if the peak value V of the voltage across capacitor $C_r$ were higher than or equal to $$\frac{V_o}{n} + V_B.$$

The condition therefor is:

$$\delta\,V_o \geqslant \frac{V_o}{n} + V_B.$$

This is filled in in formula (3') and we have:

$$\frac{\alpha\,n\,\delta}{1-\delta}\,V_B \geqslant \frac{\delta}{1-\delta}\,V_B + V_B$$

which is:

$$\frac{\alpha\,n\,\delta}{1-\delta} \geqslant \frac{1}{1-\delta} \text{ or } n \geqslant \frac{1}{\alpha\delta} \qquad (4')$$

With $\alpha \approx 10$ and $\delta \approx 1/2$ a limit value of approximately 0.2 is obtained. Since the maximum value of $\delta$ is equal to $1 - z$, the minimum limit value is approximately equal to $(1.2/\alpha)$. A low value of $n$ will be chosen if deflection coil $L_H$ has a comparatively low impedance and/or if the available voltage $V_B$ is comparatively high. The maximum collector voltage of transistor Tr is equal to $$\frac{V_o}{n} + V_B = \left(1 + \frac{\delta}{1-\delta}\right) V_B = \frac{1}{1-\delta} \cdot V_B$$

and is therefore independent of ratio $n$.

A series network $R_1$, $C_3$ which damps parasitic oscillations which might occur when the ratio $n$ is much lower than 1 is connected in parallel with winding $L_1$.

As is the case in FIG. 3 an embodiment according to FIG. 4 may be considered in which transistor Tr' is absent while the parallel arrangement of diode $D_6$ and resistor R is arranged in series with winding $L_1$. In such an embodiment the switching capacity of transistor Tr is also independent of $n$.

What is claimed is:

1. Television display apparatus provided with a circuit arrangement for generating a sawtooth deflection current through a line deflection coil, said coil being a part of a network furthermore comprising at least a trace capacitor, a retrace capacitor and a first diode through which the deflection current flows during part of the trace time of the sawtooth current while said current flows through a second diode and a controllable switch during the other part of the trace time, a primary winding of a transformer being incorporated between a direct voltage source and the switch and its secondary winding being connected through a third diode to the network, characterized in that the circuit arrangement includes switching means for blocking any current in the second diode in the retrace time.

2. Television display apparatus as claimed in claim 1 in which the third diode is connected to the retrace capacitor, characterized in that the ratio between the number of turns on the secondary winding and the number of turns on the primary winding is at least equal to approximately $$1 + \frac{1.2}{\alpha}$$

where $\alpha$ is the ratio between the retrace voltage and its direct voltage component.

3. Television display apparatus as claimed in claim 1, in which the third diode is connected to the trace capacitor, characterized in that the ratio between the number of turns on the secondary winding and the number of turns on the primary winding is at least equal to approximately (1.2/069 /αwhere $\alpha$ is the ratio between the retrace voltage and its direct voltage component.

4. Television display apparatus as claimed in claim 1, characterized in that said switching means comprises a transistor arranged in series with the second diode while the base of said transistor receives a blocking voltage in the retrace time.

5. Television display apparatus as claimed in claim 4, characterized in that the control means of the transistor includes a further secondary winding of the transformer.

6. Television display apparatus as claimed in claim 1 in which the second diode is connected to the controllable switch, characterized in that a fourth diode is arranged in series with the primary winding.

7. Television display apparatus as claimed in claim 6, characterized in that the fourth diode is shunted by a resistor.

8. A circuit arrangement for generating a sawtooth deflection current through a line deflection coil powered from a direct voltage source, said circuit comprising a trace capacitor to couple to said coil, a retrace capacitor coupled to said trace capacitor and a first diode coupled to said retrace capacitor through which the deflection current flows during part of the trace time of the sawtooth current, a second diode coupled to said retrace capacitor, a controllable switch coupled to said trace capacitor, said current flowing through said controllable switch and said second diode part of the trace time, a transformer having a primary winding to coupled to said direct voltage source and coupled to the switch, and a secondary winding, a third diode coupled to said secondary winding and one of said capacitors, and switching means coupled to said second diode for blocking any current in the second diode in the retrace time.

* * * * *

UNITED STATES PATENT AND TRADEMARK OFFICE
CERTIFICATE OF CORRECTION

PATENT NO. : 3,912,971
DATED : October 14, 1975
INVENTOR(S) : Henk Houkes

It is certified that error appears in the above-identified patent and that said Letters Patent are hereby corrected as shown below:

Claim 3, col. 8, line 8, cancel "(1.2/069/α" and insert -- $\frac{1.2}{\alpha}$ --;

Signed and Sealed this

Twentieth Day of July 1976

[SEAL]

*Attest:*

RUTH C. MASON
*Attesting Officer*

C. MARSHALL DANN
*Commissioner of Patents and Trademarks*